UNITED STATES PATENT OFFICE.

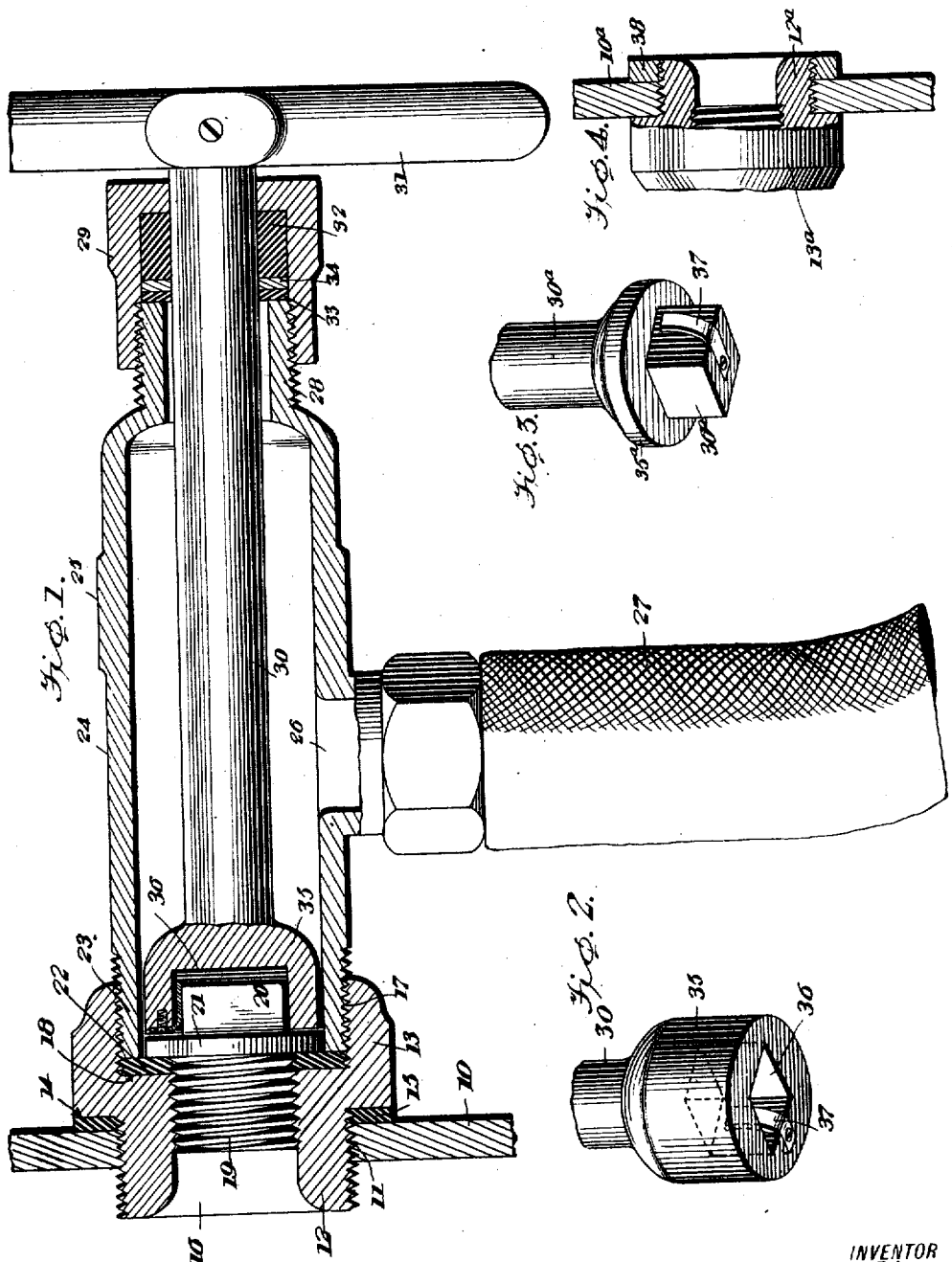

JOSEPH DARLING AND WARREN W. CURRY, OF CHICORA, PENNSYLVANIA.

BUNG FOR TANK FILLING AND DISCHARGE FITTINGS.

1,422,342.   Specification of Letters Patent.   Patented July 11, 1922.

Application filed December 2, 1919. Serial No. 341,944.

*To all whom it may concern:*

Be it known that we, JOSEPH DARLING and WARREN W. CURRY, citizens of the United States, and residents of Chicora, in the county of Butler and State of Pennsylvania, have made certain new and useful Improvements in Bungs for Tank Filling and Discharge Fittings, of which the following is a specification.

Our present invention relates generally to the filling and discharge of tanks, and more particularly to metallic barrels or containers for gasoline and other fluids in connection with which the formation of gas within the container renders such operation, particularly the discharging operation, difficult in so far as guarding against waste is concerned.

Our present invention is directed particularly to a novel bung construction adapting the same to utilization with a tank filling and discharge fitting as hereinafter described, the latter of which forms the subject matter of a separate application, and our invention is such as to bring about the advantages which will be especially pointed out in the specification to follow.

In the accompanying drawing illustrating our invention:—

Figure 1 is a longitudinal sectional view through our improvements,

Figure 2 is a detailed perspective view of one end of the plug manipulating member;

Figure 3 is a detailed perspective view of one end of a modified form of the member shown in Figure 2, and Figure 4 is a sectional view illustrating a slightly modified means of securing the bung in place.

Referring now to these figures, the barrel tank or other container in connection with which our invention is utilized, and a portion of which appears at 10 in Figures 1 and 4, has a threaded bung-hole 11, into which the reduced threaded end 12 of the bung 13 screws. This reduced end 12 of the bung provides the latter with an annular external shoulder 14 intermediate its ends and opposing the outer surface of the container and between which and the container there is preferably inserted a washer or packing 15, designed to prevent leakage at this point, and the required pressure upon which is obtained by screwing the bung tightly into the bung hole 11.

The bung 13 provided in our invention has an axial bore 16, one end of which opens through its inner reduced end 12, the said bore being threaded for at least a portion of its length and opening at its opposite end into a threaded counter-bore 17, between which and the bore 16 there is thus formed an inner annular shoulder 18 facing in a direction relatively opposite to the external shoulder 14, before mentioned.

The threads of the bore 16 receive the threaded portion 19 of a closing plug, of which the threaded portion 19 constitutes one end, the opposite end terminating in a squared portion 20 between which and the threaded portion 19 is an enlarged annular rib 21 adapted to oppose the shoulder 18, as seen particularly in Fig. 1. The shoulder 18 receives a washer or packing 22 against a portion of which the rib 21 bears, although it is to be noted that the washer 22 and the shoulder 18 are of considerable greater diameter than that of the rib 21, so as to leave an annular space around the latter for the reception of the inner threaded end 23 of a hollow barrel 24.

The threaded end 23 of the barrel 24 engages the threads of the counter bore 17 of the bung and bears against the washer 22 in the engaged position in connection with the bung, as seen in Figure 1, and has a polygonal surface 25 intermediate its ends for the connection of a wrench to screw the barrel 24 tightly in place with respect to the bung. The barrel 24 is furthermore provided with an intermediate angular nipple to which a filling or discharge pipe 27 may be engaged by any suitable means, the outer end of the barrel being reduced and externally threaded as at 28 for the reception of an apertured cap 29 inwardly through the aperture of which projects an axially disposed stem 30.

Outwardly beyond the outer end of the barrel 24 the stem 30 has a handle 31 of any suitable formation, the cap or gland 39 enclosing packing 32 and washers 33 and 34 around the outer portion of the stem 30 to prevent leakage at the outer end of the barrel.

As seen in Figures 1 and 2, the inner end of the stem 30 within the barrel 24 is enlarged as at 35, this enlargement having a squared end socket 36 for the reception of the squared end 20 of the screw plug 19 of the bung. The stem of enlargement 39 is also provided with a spring finger 37 secured thereto, and the free end of which projects within the squared socket 36 adjacent one side wall so as to frictionally grip the squared end 20 at one side, and thus hold the plug in connection with the stem 30 after the plug has been turned out of the bung to permit of the passage of fluid either to or from the container 10.

It is obvious that instead of screwing the bung 13 into a threaded opening of the barrel tank, or other container, as described in connection with Fig. 1, and which construction is preferred in connection with container already in use, we may, if so desired, and in connection with containers to be constructed, provide for the extension of the threaded end 12ª of the bung 13ª, as seen in Figure 4, entirely through the opening of the container 10ª, so as to adapt the same to the reception of a threaded clamping ring 38 within the container and against the inner surface of the latter. In this way the external shoulder of the bung will abut the outer surface of the container and the washer or packing 15 may be dispensed with by brazing the parts together at their points of contact.

We may furthermore provide the plug manipulating stem 30 with a squared extension at its inner end as seen in Figure 3, where the stem appears at 30ª and its enlarged end 35ª has a squared extension 36ª with a spring finger 37ª. In this case the squared extension 36ª will of course enter a squared socket of the bung plug, which latter will be modified in respect to the construction of Figure 1 to this extent.

It is obvious that by thus providing a bung so constructed as to permit of the association therewith of a filling or discharging device, at the time the bung plug is fully closed, we are enabled to either discharge or fill the container without danger of leakage even in connection with particularly permeable fluids or fluids developing gaseous pressure within their containers; for instance the lighter hydro-carbons.

In use with the bung 13 associated with the barrel, tank or other container, either as seen in Fig. 1 or as seen in Fig. 4, the plug thereof is of course normally closed. In discharging the contents the threaded end 23 of the barrel 24 is first screwed within the threaded counter-bore 17 of the bung, until it tightly engages the packing or washer 22 held against the internal shoulder 18 of the bung and said end surrounds the rib 21 of the plug. Then after the pipe 27 is connected to the nipple 26 the handle 31 of stem 30 is grasped and the stem pushed inwardly until its inner enlarged end properly engages the outer portion of the plug. The handle 31 is then turned to unscrew the threaded portion 19 of the plug and from the threaded portion 16 of the bung, and when entirely unscrewed, the inner enlarged end of the stem with the plug in connection therewith by virtue of the engagement of the plug by the spring finger, may be drawn to a point adjacent the outer end of the barrel past the nipple 26 and thus free outlet of the fluid provided for.

In closing the tank or container, the plug is returned to the bung and screwed therein tightly against the washer 22 before the barrel 24 is finally unscrewed and removed.

We claim:—

A bung comprising a bushing having an externally threaded reduced inner end adapted to extend through bung hole of the container, said reduced and threaded portion defining an annular shoulder adapted to be seated against the outer face of the container in fluid tight relation, said inner end also having a threaded central bore, the outer end of the bushing expanded and having an enlarged internally threaded counter bore defining an annular shoulder at its inner end, a packing ring seated on this shoulder, a plug having a wrench head at its outer end and the inner end threaded to be seated in the first mentioned bore of the bushing, an annular collar extending laterally from said plug intermediate its threaded portion and the wrench head, said collar adapted to be seated on said packing ring, the diameter of said collar being sufficiently less than the diameter of the counter bore to permit passage of the threaded end of a nozzle to be screwed into the counter bore past the collar and against the aforesaid packing ring.

JOSEPH DARLING.
WARREN W. CURRY.